(12) United States Patent
Lamela et al.

(10) Patent No.: US 10,683,638 B2
(45) Date of Patent: Jun. 16, 2020

(54) SYSTEM FOR REPOSITIONING A BACKHOE DIGGER

(71) Applicant: CNH INDUSTRIAL AMERICA LLC, New Holland, PA (US)

(72) Inventors: Anthony John Lamela, Gilberts, IL (US); Chad Milo Blakewell, Dallas City, IL (US)

(73) Assignee: CNH Industrial America LLC, New Holland, PA (US)

( * ) Notice: Subject to any disclaimer, the term of this patent is extended or adjusted under 35 U.S.C. 154(b) by 185 days.

(21) Appl. No.: 15/701,745

(22) Filed: Sep. 12, 2017

(65) Prior Publication Data
US 2019/0078295 A1    Mar. 14, 2019

(51) Int. Cl.
*G06F 7/70* (2006.01)
*G06G 7/00* (2006.01)
(Continued)

(52) U.S. Cl.
CPC .......... *E02F 9/2041* (2013.01); *B60G 17/056* (2013.01); *B60G 21/06* (2013.01); *E02F 3/434* (2013.01); *E02F 9/024* (2013.01); *E02F 9/028* (2013.01); *E02F 9/085* (2013.01); *B60G 2202/413* (2013.01); *B60G 2204/80* (2013.01); *B60G 2204/8304* (2013.01); *B60G 2300/09* (2013.01); *B60G 2400/252* (2013.01); *B60G 2500/30* (2013.01); *E02F 9/265* (2013.01)

(58) Field of Classification Search
CPC ......... E02F 9/2041; E02F 3/434; E02F 9/024; E02F 3/32; E02F 1/00; E02F 9/028; E02F 9/085; E02F 9/265; B60G 17/056; B60G 21/06; B60G 2202/413; B60G 2204/80; B60G 2204/8304; B60G 2300/09; B60G 2400/252; B60G 2500/30
USPC ........................... 701/50; 37/443; 280/763.1
See application file for complete search history.

(56) References Cited

U.S. PATENT DOCUMENTS

| | | |
|---|---|---|
| 3,528,675 A | 9/1970 | Brown |
| 4,288,196 A | 9/1981 | Sutton, II |
| (Continued) | | |

FOREIGN PATENT DOCUMENTS

| | | |
|---|---|---|
| DE | 202004004934 U1 | 9/2004 |
| FR | 2503055 A1 | 10/1982 |
| (Continued) | | |

OTHER PUBLICATIONS

Extended European Search Report for EP Application No. 18193930.7 dated Feb. 28, 2019 (eight pages).

*Primary Examiner* — Mahmoud S Ismail
(74) *Attorney, Agent, or Firm* — Peter Zacharias; Patrick Sheldrake

(57) ABSTRACT

A control system for a work vehicle, includes a controller. The controller includes a processor a memory device communicatively coupled to the processor, such that the memory device stores instructions that cause the processor to receive a first control signal indicative of performing relocation operations. Furthermore, the instructions cause the processor to instruct an actuator assembly to drive a chassis of the work vehicle in an upward direction relative to wheels of the work vehicle in response to receiving the first control signal, such that a front stabilizer and a rear stabilizer are disengaged from a ground.

19 Claims, 6 Drawing Sheets

(51) Int. Cl.
  *G06G 7/76* (2006.01)
  *E02F 9/20* (2006.01)
  *E02F 9/08* (2006.01)
  *E02F 9/02* (2006.01)
  *B60G 17/056* (2006.01)
  *B60G 21/06* (2006.01)
  *E02F 3/43* (2006.01)
  *E02F 3/32* (2006.01)
  *B60S 9/02* (2006.01)
  *E02F 9/26* (2006.01)

(56) References Cited

U.S. PATENT DOCUMENTS

| | | |
|---|---|---|
| 7,634,863 B2 | 12/2009 | Stanek et al. |
| 7,726,048 B2 | 6/2010 | Stanek et al. |
| 7,753,132 B2 | 7/2010 | Stanek et al. |
| 2004/0256815 A1 | 12/2004 | Eichhorn et al. |
| 2008/0127531 A1* | 6/2008 | Stanek .................. E02F 9/2004 37/443 |
| 2012/0086192 A1* | 4/2012 | Kimener ................ B60D 1/665 280/763.1 |
| 2015/0176249 A1 | 6/2015 | McKee et al. |
| 2015/0376865 A1 | 12/2015 | McKee et al. |
| 2017/0362784 A1* | 12/2017 | Hoffmann .............. E01C 23/088 |
| 2018/0179892 A1* | 6/2018 | Moberg .................. E21C 27/24 |

FOREIGN PATENT DOCUMENTS

| | | |
|---|---|---|
| GB | 1500741 A | 2/1978 |
| JP | S5682615 A | 7/1981 |

\* cited by examiner

SYSTEM FOR REPOSITIONING A BACKHOE DIGGER

BACKGROUND

The present disclosure generally relates to a system for repositioning a backhoe digger.

Certain work vehicles (e.g., tractors, harvesters, skid steers, etc.) may support tools configured to plow a field, deposit seeds, excavate soil, or accomplish other suitable operations. For example, a work vehicle may support a backhoe to excavate soil and create an excavation of a certain dimension. Generally, excavating soil may be a tedious process that requires an operator (e.g., person operating the work vehicle) to manually perform a series of tasks. For example, the operator may manually park the work vehicle, engage front and rear stabilizers of the work vehicle, excavate the ground, disengage the front and rear stabilizers, manually drive the work vehicle to a new location, and repeat this process until an excavation of target dimensions has been created (e.g., or until a target amount of soil has been excavated). As a result, operator fatigue may result. In some instances, the operator may not perform these tasks efficiently (e.g., may drive the work vehicle to a less suitable location, etc.), leading to inaccuracies in the dimensions of the excavation and/or to time lost in correcting these inaccuracies. As a result, productivity may be reduced.

BRIEF DESCRIPTION

In one embodiment, a control system for a work vehicle, includes a controller. The controller includes a processor a memory device communicatively coupled to the processor, such that the memory device stores instructions that cause the processor to receive a first control signal indicative of performing relocation operations. Furthermore, the instructions cause the processor to instruct an actuator assembly to drive a chassis of the work vehicle in an upward direction relative to wheels of the work vehicle in response to receiving the first control signal, such that a front stabilizer and a rear stabilizer are disengaged from a ground.

In another embodiment, a control system for a work vehicle includes a control system. The control system includes a controller that includes a processor and a memory device communicatively coupled to the processor, such that the memory device stores instructions that cause the processor perform certain functions. Specifically, the instructions cause the processor to receive a first control signal indicative of performing relocation operations, such that performing relocation operations include instructing a movement control system to move the work vehicle a target distance along a direction of travel. In addition, the instructions cause the processor to instruct an actuator assembly to drive a chassis of the work vehicle in an upward direction relative to wheels of the work vehicle in response to receiving the first control signal, such that a front stabilizer and a rear stabilizer are disengaged until a first vertical distance between the front stabilizer and the ground is greater than a first vertical threshold distance, until a second vertical distance between the rear stabilizer and the ground is greater than a second vertical threshold distance, or a combination thereof.

In a further embodiment, a work vehicle that excavates includes a backhoe tool that excavates a ground, a suspension system, and a control system that communicatively couples to the suspension system. The control system includes a controller that includes a processor and a memory device communicatively coupled to the processor, such that the memory device stores instructions that cause the processor to perform certain functions. Specifically, the instructions cause the processor to receive a first control signal indicative of performing relocation operations, such that performing relocation operations include instructing a movement control system to move the work vehicle a target distance along a direction of travel. Furthermore, the instructions cause the processor to instruct an actuator assembly to drive a chassis of the work vehicle in an upward direction relative to wheels of the work vehicle in response to receiving the first control signal, such that a front stabilizer and a rear stabilizer are disengaged until a first vertical distance between the front stabilizer and the ground is greater than a first vertical threshold distance, until a second vertical distance between the rear stabilizer and the ground is greater than a second vertical threshold distance, or a combination thereof. In addition, the instructions cause the processor to instruct the actuator assembly to drive the chassis in a downward direction until the first vertical distance between the front stabilizer and the ground is zero, until the second vertical distance between the rear stabilizer and the ground is zero, or a combination thereof, in response to determining that the work vehicle has moved the target distance along the direction of travel.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
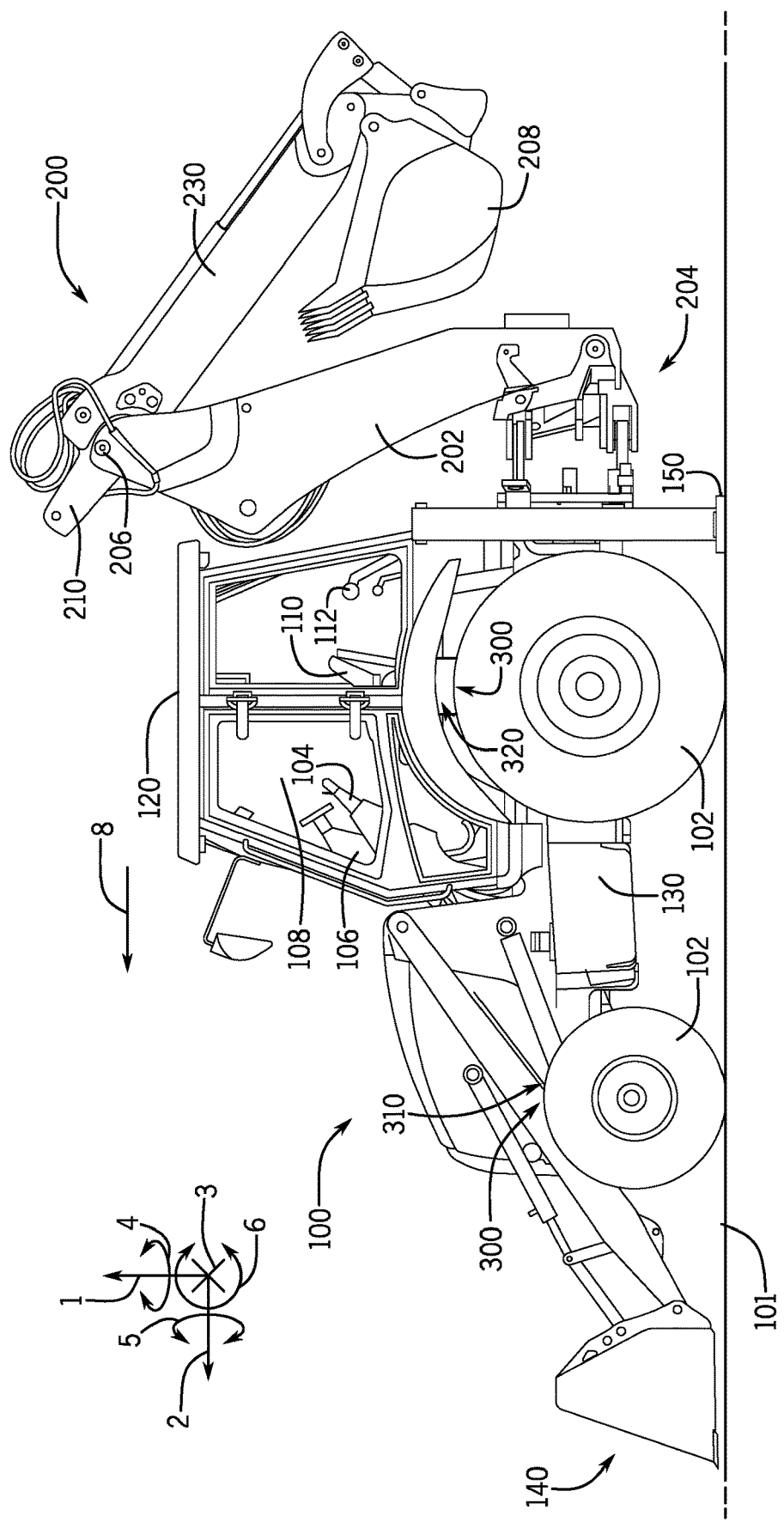
FIG. 1 is a side view of an embodiment of a work vehicle having a backhoe tool and a suspension system that may vertically move a chassis of the work vehicle.

Turning to the drawings, FIG. 1 is a side view of an embodiment of a work vehicle 100 having a backhoe tool 200 and a suspension system 300 that may vertically move a chassis 130 of the work vehicle 100. In the illustrated embodiment, the work vehicle 100 is a tractor. However, it should be appreciated that the backhoe tool 200 and/or the adjustable suspension system disclosed herein may be utilized on other work vehicles, such as but not limited to on-road trucks, tractors, harvesters, and construction equipment. In the illustrated embodiment, the work vehicle 100 includes a cab 120 and a chassis 130. In certain embodiments, the chassis 130 is configured to support a motor (e.g., diesel engine, etc.), a hydraulic system (e.g., including a pump, valves, reservoir, etc.), and other components (e.g., an electrical system, a cooling system, etc.) that may facilitate operation of the work vehicle. In addition, the chassis 130 is configured to support the cab 120 and wheels 102. The wheels 102 may rotate to advance and direct the movement of the work vehicle 100 along a direction of travel 8. The wheels 102 may be driven to rotate along the ground 101 by the motor and/or by component(s) of the hydraulic system (e.g., hydraulic motor(s), etc.). While the illustrated work vehicle 100 includes wheels 102, in alternative embodiments, the work vehicle may include tracks or a combination of wheels and tracks.

The cab 120 is configured to house an operator of the work vehicle 100. Accordingly, various controls are positioned within the cab 120 to facilitate operator control of the work vehicle 100. For example, a transmission shift lever 104 may enable the operator to control the transmission and a steering wheel 106 may enable the operator to control the direction of travel 8, thereby, respectively, facilitating adjustment of the speed and the direction of travel of the work vehicle 100. In the illustrated embodiment, the cab 120 also includes a door 108 to facilitate ingress and egress of the operator from the cab 120. In the illustrated embodiment, a seat 110 is configured to receive and to support the operator. Furthermore, the illustrated work vehicle includes a front attachment 140, which may be controlled (e.g., raised, lowered, etc.) by attachment controls 112 of the work vehicle 100. In some embodiments, the front attachment 140 may be configured to engage the ground 101 to enable the front attachment 140 to serve as a front support. While the illustrated front attachment 140 includes a loader, in alternative embodiments, the front attachment may include an excavator assembly, a bucket assembly, a tilling assembly, or a gripper assembly, among other tools.

In the illustrated embodiment, the backhoe tool 200 includes a boom 202, which pivotally couples to the rear end of the work vehicle chassis 130 via a pivot joint 204. Furthermore, the backhoe tool 200 includes an inner dipper 210 coupled to the boom 202 via a pivot joint 206 at a first end of the inner dipper 210. An outer dipper 230 is configured to slide along the inner dipper 210. A bucket 208 is coupled to the outer dipper 230 and may excavate soil, carry loads, and the like. In some embodiments, the movement of the backhoe tool and its various components may be facilitated by actuators or a valve assembly associated with the backhoe tool. In addition, the attachment controls 112 may facilitate operator control of the backhoe tool 200. For example, the controls may enable the operator to control the position of the bucket 208 by moving the outer dipper 230 away from the pivot joint 206, along the inner dipper 210.

The boom 202 and inner dipper 210 of the backhoe tool 200 may independently rotate relative to the chassis 130 about a lateral axis 3 in pitch 6 via the respective pivot joints 204 and 206. Furthermore, rotation of the backhoe tool 200 relative to the chassis 130 about the longitudinal axis 2 in roll 5 may be substantially blocked. In some embodiments, the backhoe tool 200 may rotate relative to the chassis 130 about the vertical axis 1 in yaw 4. The backhoe tool 200 may be controlled by the operator of the work vehicle 100 (e.g., via the attachment controls 112). Rotation of the boom 202, rotation of the inner dipper 210, and translation of the outer dipper 230 relative to the inner dipper 210 may each be controlled independently of one another.

In the illustrated embodiment, a rear stabilizer 150 is a substantially cylindrical member attached to the chassis 130 at the rear of the work vehicle 100. In some embodiments, the rear stabilizer 150 is oriented vertically and configured to abut the ground 101 (e.g., when the suspension system is lowered). Furthermore, the rear stabilizer 150 may be rigidly coupled to the rear of the chassis 130 such that movement of the rear stabilizer 150 relative to the chassis 130 is substantially blocked. In alternative embodiments, the rear stabilizer 150 may be configured to translate vertically (e.g., along the vertical axis 1) relative to the chassis to control the vertical position of the rear stabilizer 150 relative to the ground 101. Furthermore, when the front attachment 140 (e.g., which may function as a front stabilizer) and the rear stabilizer 150 contact the ground 101 and movement of both relative to the chassis 130 is blocked, the front attachment 140 and the rear stabilizer 150 may substantially block the rotation in pitch 6 of the chassis 130 about the lateral axis 3. As such, the rotation of the work vehicle about the lateral axis 3 in pitch 6 may be substantially blocked in response to the front attachment 140 (e.g., front stabilizer) and the rear stabilizer 150 contacting the ground 101. In some embodiments, a valve assembly (e.g., hydraulic cylinders) may be configured to hold the front attachment 140 in the ground-engaging position when using the backhoe tool 200 and while moving to a new excavation location.

Furthermore, in the illustrated embodiment, the work vehicle 100 includes a suspension system 300 that couples the wheels 102 to the chassis 130. The suspension system 300 may be configured to absorb energy (e.g., associated with movement/vibrations experienced by the chassis), thereby enhancing operator comfort. For example, the suspension system 300 may enable the chassis 130 to move relative the wheels 102 along a vertical axis 1 of the work vehicle 100, while damping energy associated with the movement. In addition, the suspension system 300 include a front suspension assembly 310 and a rear suspension assembly 320. The front suspension assembly 310 and the rear suspension assembly 320 may each include hydraulic cylinder(s) to control the movement of the chassis 130 relative the wheels 102. For example, the valve assembly may receive control signals indicative of controlling the fluid flow to various cylinders, whereby controlling the fluid flow to the various cylinders controls the height of the chassis 130. Accordingly, the valve assembly may facilitate the translation of the chassis 130 of the work vehicle 100 along the vertical axis 1 relative to the wheels 102. Controlling movement of the chassis 130 relative the wheels 102 may enhance the comfort for the operator. Furthermore, adjusting the height of the chassis 130 may facilitate ground excavation operations performed by the work vehicle 100 by raising the chassis 130 for movement, and then lowering the front attachment 140 and the rear stabilizer 150 on the ground for excavation.

The disclosed subject matter includes a suspension system 300 to facilitate the translation of the chassis 130 along the vertical axis 1 relative the wheels 102. Accordingly, the suspension system 300 may be configured to raise the chassis 130, thereby raising the front attachment 140 and the rear stabilizer 150. As discussed in detail below, the disclosed subject matter also includes a controller 250 that may receive a user input (e.g., via the user interface) indicative of excavating soil, whereby the controller 250 causes the work vehicle to excavate (e.g., perform excavation operations). Excavating may include the digging (e.g., of soil), which, in some embodiments, may be performed by the operator. In addition, the controller 250 may receive a user input indicative of performing relocation operations, thereby causing the chassis 130 to move along the vertical axis 1 to disengage the front attachment 140 and the rear stabilizer 150 from the ground 101, instructing a movement control system (e.g., a work vehicle transmission) to drive the work vehicle 100 along the direction of travel 8 a suitable longitudinal distance, stopping the work vehicle 100, lowering the chassis 130 until the front attachment 140 and the rear stabilizer 150 contact the ground, and engaging the backhoe to excavate. As such, performing digging tasks (e.g., the excavation operations) may be facilitated and the efficiency at which the tasks are completed may be improved by the embodiments disclosed herein.

Figure 2:
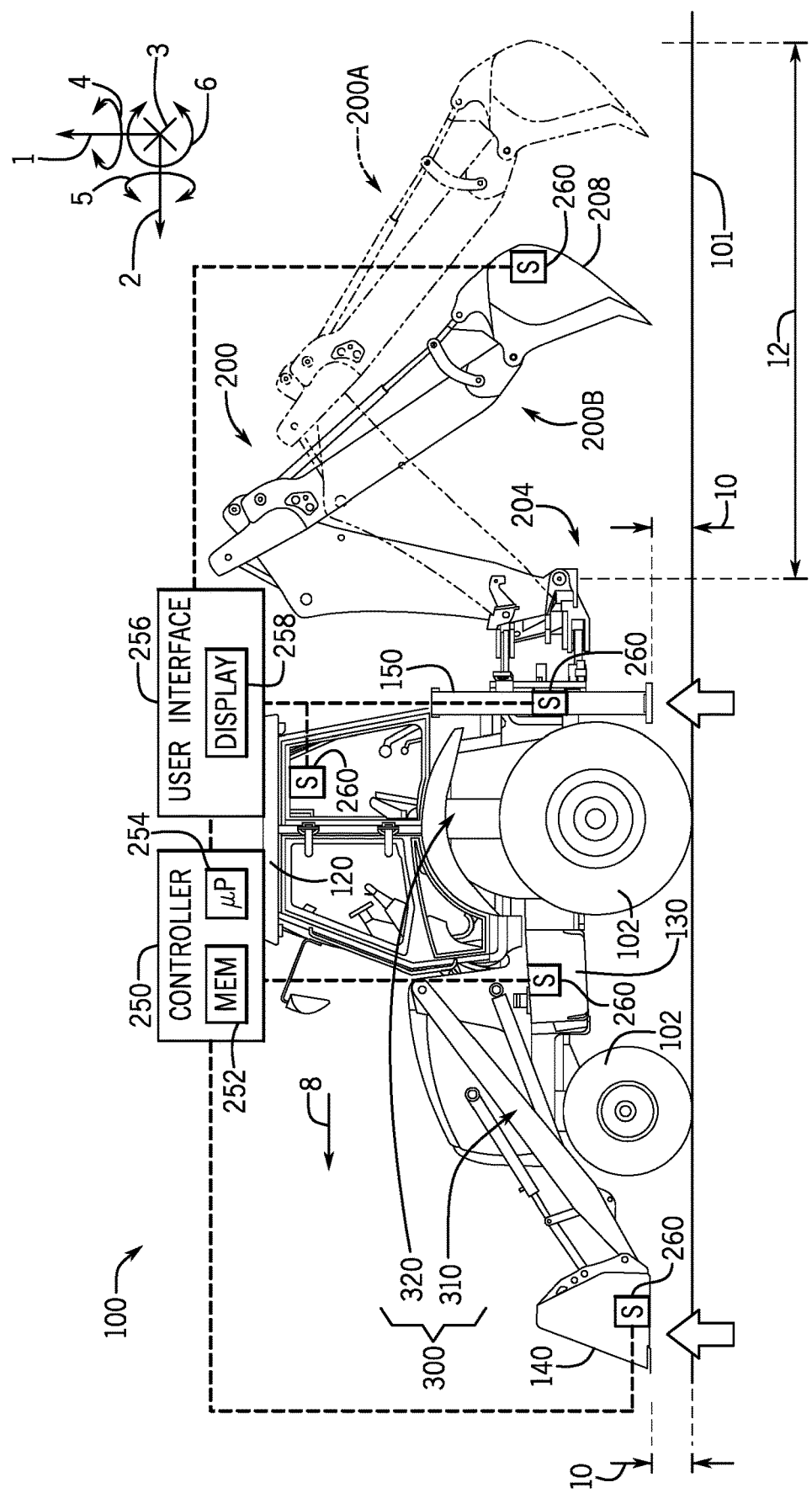
FIG. 2 is a side view of the work vehicle of FIG. 1, in which the suspension system is raised to facilitate movement of the work vehicle.

FIG. 2 is a side view of the work vehicle 100 of FIG. 1, in which the suspension system 300 is raised to facilitate movement of the work vehicle. The work vehicle 100 includes a controller 250 that includes a memory device 252 configured to store instructions, which may be executed by a processor 254. The controller 250 may also include one or more storage devices and/or other suitable components. The processor 254 may be used to execute software, such as software for controlling the relocation operations (e.g., raising the chassis 130, instructing the movement control system to drive the work vehicle along the direction of travel the target distance, lowering the chassis 130, commencing excavating, etc.). Moreover, the processor 254 may include multiple microprocessors, one or more "general-purpose" microprocessors, one or more special-purpose microprocessors, and/or one or more application specific integrated circuits (ASICs), or some combination thereof. For example, the processor 254 may include one or more reduced instruction set (RISC) processors.

The memory device 252 may include a volatile memory, such as random access memory (RAM), and/or a nonvolatile memory, such as read-only memory (ROM). The memory device 252 may store a variety of information and may be used for various purposes. For example, as mentioned above, the memory device 252 may store processor-executable instructions (e.g., firmware or software) for the processor 254 to execute, such as instructions for controlling relocation operations. The storage device(s) 252 (e.g., nonvolatile storage) may include ROM, flash memory, a hard drive, or any other suitable optical, magnetic, or solid-state storage medium, or a combination thereof. The storage device(s) 252 may store data (e.g., position of the chassis, the front attachment 140, the rear stabilizer 150, etc.), instructions (e.g., software or firmware for controlling relocation operations, etc.), and any other suitable data.

In the illustrated embodiment, the controller 250 is communicatively coupled to a user interface 256 having a display 258. The user interface 256 with the display 258 may be located within the cab 120 of the work vehicle 100 and/or at a remote site, for example. The user interface 256 may be communicatively coupled to the controller 250 by a CAN bus, an ISOBUS system, a wireless connection, or any other suitable connection. The user interface 256 may be configured to enable an operator to manually control the relocation operations and/or enable the operator to engage automatic control of operations disclosed herein. In addition, the display 258 may be configured to present the operator with a graphical representation of the status of the relocation operations, the position of the suspension system (e.g., raised or lowered), the status of the transmission (e.g., engaged for forward movement, parked, neutral, etc.), a graphical representation of the tasks the operator may cause the work vehicle to perform, or some combination thereof, for example. In some embodiments, the controller 250 and the user interface 256 are elements of the work vehicle 100 (e.g., housed inside the work vehicle cab, etc.). In alternative embodiments, the controller 250 and/or the user interface 256 may be housed at a remote station (e.g., away from the work vehicle 100).

In the illustrated embodiment, various sensor assemblies 260 are positioned at various locations on the work vehicle 100 to detect parameters associated with operation of the work vehicle 100. The sensor assembly 260 may include an inertial measurement unit (IMU) sensor, steering sensor(s), radar velocity sensor(s), laser sensor(s), sonar sensor(s), infrared sensor(s), capacitance sensor(s), ultrasonic sensor(s), magnetic sensor(s), optical sensor(s), or any other suitable devices configured to detect one or more parameters associated with the work vehicle. In the illustrated embodiment, one sensor assembly 260 is coupled to the front attachment 140, another sensor is coupled to the rear stabilizer 150, a further sensor assembly is coupled to the chassis 130, and a sensor assembly is coupled to the bucket 208. For example, the sensor assembly 260 positioned on the front attachment tool 140, the sensor assembly positioned on the rear stabilizer 150, and/or the sensor assembly positioned on the chassis 130 may include respective position sensor(s) configured to detect position relative to the ground 101. Although the illustrated embodiment includes four sensor assemblies 260, in further embodiments, the work vehicle 100 may include 1, 2, 5, 6, 10, 25, or any suitable number of sensor assemblies 260.

Furthermore, the controller 250 may perform the relocation operations in response to receiving a user input (e.g., a control signal received by the controller 250) from the user interface 256. For example, the operator may depress a button assembly on the user interface 256 to commence relocation operations. In some embodiments, after the operator completes the digging portion (e.g., excavating the ground 101), the controller 250 may automatically perform the relocation operation. In alternative embodiments, the controller 250 may execute relocation operations in response to an automated control scheme (e.g., based on a timer and/or a course). In addition or alternatively, the controller 250 may execute relocation operations in response to sensor data retrieved by the sensor assembly 260.

In some embodiments, commencing relocation operations may include raising the chassis 130 until the front attachment 140 and the rear stabilizer 150 are separated from the ground 101 by a vertical distance 10 (e.g., distance along the vertical axis). In more detail, commencing the relocation operations may include the controller 250 receiving a control signal indicative of raising the chassis 130, for example, a threshold vertical distance 10 above the ground 101 along the upward direction 11. Moreover, when the front attachment 140 and/or the rear stabilizer 150 are in contact with the ground 101, raising the chassis 130 causes the front attachment 140 and the rear stabilizer 150 to raise (e.g., due to their fixed position relative to the chassis 130), thereby causing the front attachment 140 and the rear stabilizer 150 to disengage the ground 101. In some embodiments, the front attachment 140 and the rear stabilizer 150 are disengaged (and engaged) with the ground 101 based on the vertical movement of the suspension system 300. The controller 250 is communicatively coupled to the sensor assemblies 260 (e.g., infrared sensors) positioned on the front attachment 140 and the rear stabilizer 150, respectively, such that the controller 250 may raise the chassis 130 until the sensor assemblies 260 detect that the front attachment 140 and/or the rear stabilizer 150 are above a threshold vertical distance 10 from the ground 101. The vertical distance 10 may be any suitable distance (e.g., 0.5 meter) from the ground 101. While in the illustrated embodiment the respective thresholds for the front attachment 140 and the rear stabilizer 150 are the same, in other embodiments, the respective thresholds may be different.

In the illustrated embodiment, the controller 250 may cause the backhoe tool 200 to retract from a raised extended position 200A to a raised retracted position 200B. More specifically, in response to receiving the user input to commence relocation operations and/or in response to raising the chassis 130 (e.g., in response to sensor data from the sensor assemblies 260 indicating that the front attachment 140 and rear stabilizer 150 are above the threshold vertical distance 10 from the ground 101), the controller 250 may instruct actuators associated with the backhoe tool 200 to retract the backhoe tool 200 from the raised extended position 200A to the raised retracted position 200B. In some embodiments, retracting the backhoe tool 200 to the raised retracted position 200B may facilitate the translation of the work vehicle 100 along the direction of travel 8 (e.g., by not having the backhoe tool 200 contacting the ground 101).

Furthermore, after the controller 250 receives an indication that 140 and/or 150 have been raised to a vertical position above the threshold vertical distance 10 and/or an indication that the backhoe tool 200 has been retracted to the position 200B, the controller 250 may instruct the movement control system to drive the work vehicle 100 forward the target distance along the direction of travel 8. In some embodiments, the movement control system may include a transmission that may receive instructions from the controller 250 to move the work vehicle by engaging the transmission. In another embodiment, the movement control system may activate hydraulic motors that drive the wheels of the work vehicle, thereby driving the work vehicle forward. For example, after the work vehicle 100 has excavated an excavation with the backhoe tool 200, it may be desirable for the work vehicle 100 to advance forward (e.g., along the direction of travel 8) to continue to expand the dimensions of the excavation. For example, it may be desirable for the work vehicle 100 to advance forward a distance equal to a dig length 12 of the backhoe tool 200. The dig length 12 may refer to the maximum length the backhoe tool 200 is configured to excavate (e.g., along the longitudinal axis 2). In alternative embodiments, the work vehicle 100 may translate forward any suitable distance (other than the distance of the dig length 12).

In some embodiments, the controller 250 instructs the movement control system to drive the wheels 102 in rotation in response to receiving sensor feedback (e.g., indicative of starting relocation operations, indicative of raising the chassis 130 until the front attachment 140 and rear stabilizer 150 are above the threshold vertical distance 10 from the ground 101, etc.). Then the work vehicle 100 may continue relocation operations. In addition to instructing the movement control system to drive the work vehicle, the controller 250 may also control a steering system of the work vehicle to control the direction of travel 8 of the work vehicle 100. A front vision system may be included on the (e.g., front of the) work vehicle 100 to provide feedback to that controller for repositioning of the work vehicle 100. In some embodiments, the work vehicle may include a spatial locating device (e.g., Global Positioning System (GPS)) that may provide the controller 250 with feedback data used to control the steering system of the work vehicle. As such, the work vehicle 100 may be configured to automatically steer and travel (e.g., without an operator input) to perform relocation operations.

Furthermore, after the work vehicle 100 has traveled the suitable distance (e.g., the dig length 12), the controller 250 may instruct the movement control system to stop the work vehicle 100. For example, before the work vehicle 100 travels the suitable distance, the controller 250 may engage the brakes of the braking system of the work vehicle 100 to bring the work vehicle 100 to a stop at or near the suitable distance. In some embodiments, the operator may instruct the controller 250 to not advance the work vehicle 100 forward along the direction of travel 8. Alternatively or additionally, the operator may instruct the controller 250 to advance the work vehicle 100 when the work vehicle 100 is stationary. In some embodiments, the controller 250 may not be configured to instruct the movement control system to automatically advance the work vehicle, such that instead the operator instructs the movement control system to advance the work vehicle.

Figure 3:
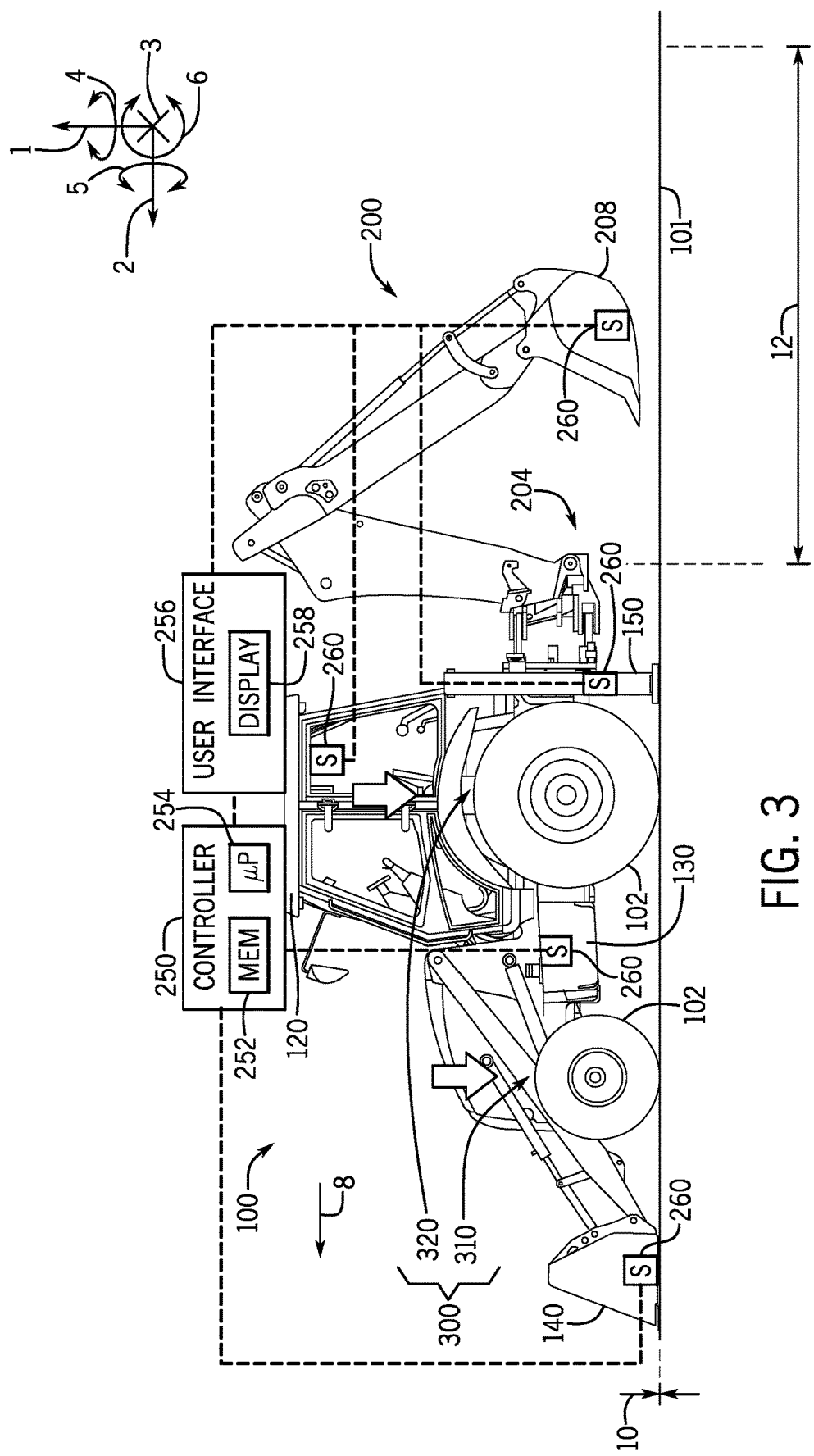
FIG. 3 is a side view of the work vehicle of FIG. 1, in which the suspension system is lowered during relocation operations.

FIG. 3 is a side view of the work vehicle 100 of FIG. 1, in which the suspension system 300 is lowered during the relocation operations. After the work vehicle 100 has driven forward (e.g., along the direction of travel 8) the suitable distance (e.g., the dig length 12), and the work vehicle 100 has been brought to a stop, the controller 250 may instruct the chassis 130 to lower. In some embodiments, the controller 250 may instruct the chassis 130 to lower until the front attachment 140 and the rear stabilizer 150 contact the ground 101. The front attachment 140 and the rear stabilizer 150 may facilitate the relocation operation by blocking rotation along the lateral axis 3 in pitch 6 while engaged with the ground 101. For example, in the illustrated embodiment, the front attachment 140 and the rear stabilizer are positioned to contact the ground 101 (e.g., when the chassis 130 is lowered), thereby substantially reducing rotation along the lateral axis 3 in yaw 6.

More specifically, the controller 250 may output a control signal to a valve assembly of the suspension system 300 of the work vehicle 100 indicative of instructions to lower the chassis 130. For example, in response to the work vehicle 100 being positioned at a suitable distance (e.g., after traveling a distance equal to the dig length 12), the controller 250 may output a signal to the valve assembly indicative of instructions to lower the front suspension assembly 310 and/or the rear suspension assembly 320, thereby lowering the chassis 130. In some embodiments, the controller 250 may instruct the chassis to lower until the sensor assembly 260 determines that the front attachment and/or the rear stabilizer 150 contact the ground 101.

In some embodiments, the front attachment 140 and/or the rear stabilizer 150 may be lowered via a control signal from the controller 250. The valve assembly of the suspension system 300 receives the control signal to lower the chassis 130. The valve assembly may continue to lower the chassis until the controller 250 receives feedback from the sensor assembly 260 indicating that the front attachment 140 and/or the rear stabilizer 150 are in contact with the ground 101. In some embodiments, the controller 250 instructs the valve assembly to stop lowered the suspension assembly when the vertical distance is zero (e.g., based on the sensor assembly detecting that the vertical distance is zero. Alternatively or in addition, the controller 250 may control the front suspension assembly 310 and the rear suspension assembly 320 separately based on the feedback from the sensor assemblies 260. For example, the controller 250 my instruct the suspension system 300 to lower the rear suspension assembly 320, thereby lowering the rear stabilizer 150, while maintaining the front suspension assembly 310 raised, thereby not lowering the front attachment 140. Furthermore, after the controller 250 determines that the front attachment 140 and the rear stabilizer 150 contact the ground 101, the controller 250 may commence excavating an excavation (e.g., hole, trench, etc.).

Figure 4:
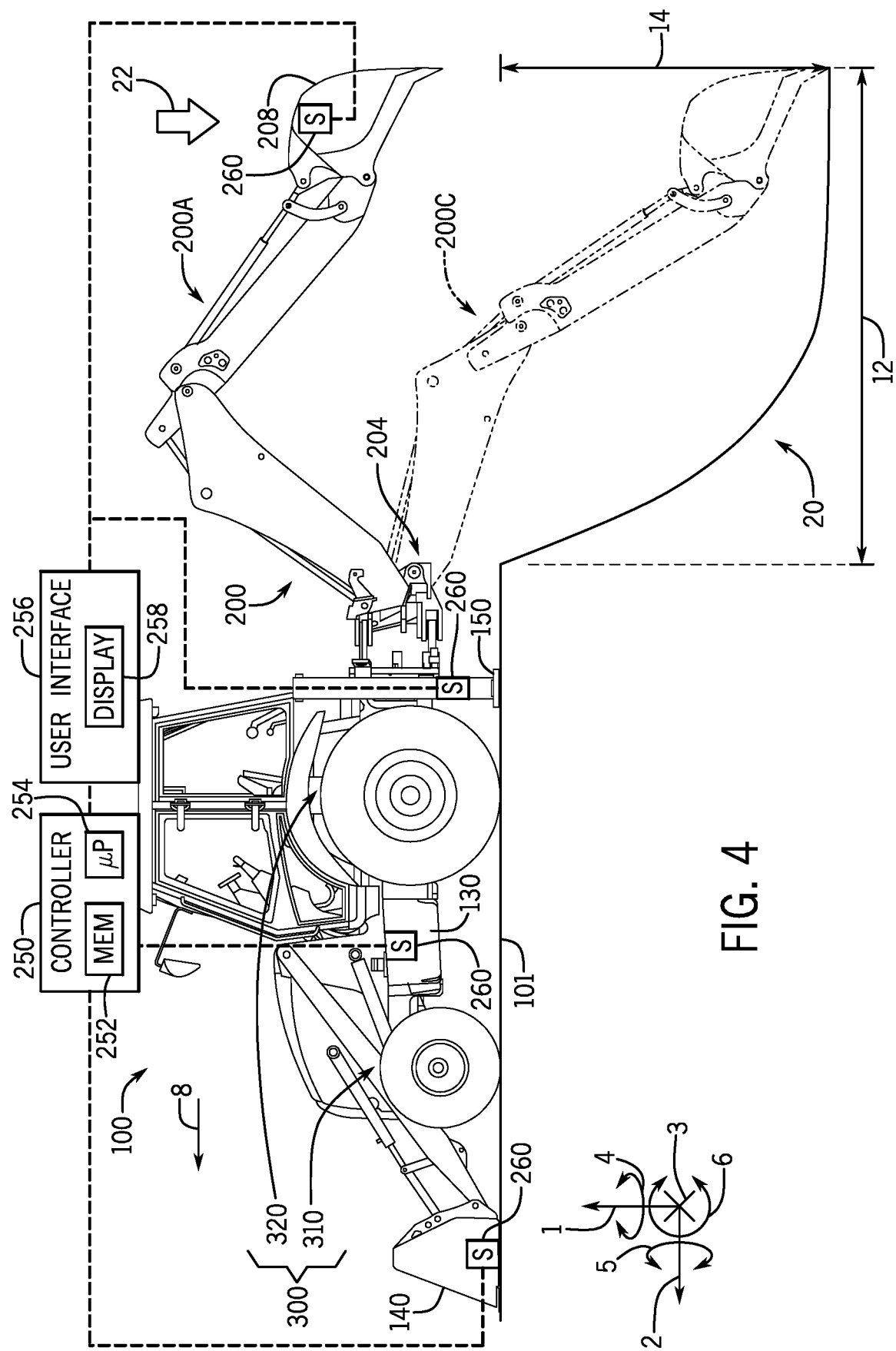
FIG. 4 is a side view of the work vehicle of FIG. 1, excavating with the backhoe tool.

FIG. 4 is a side view of the work vehicle of FIG. 1, excavating with the backhoe tool 200. In the illustrated embodiment, the work vehicle 100 is excavating in excavation 20 of the length 12 and the depth 14. The dimensions of the excavation 20 (e.g., the length 12 and the depth 14) may be determined by the dimensions of the backhoe tool 200. For example, a backhoe tool longer in length may be configured to excavate the excavation of longer length and/or greater depth. Moreover, in the illustrated embodiment, the work vehicle 100 may commence excavating by lowering the backhoe tool 200 along a downward direction 22 (e.g., substantially parallel to the vertical axis 1) from a raised extended position 200A to a lowered extended position 200C, thereby excavating (e.g., removing and/or digging) dirt via the bucket 208. In some embodiments, the controller determines whether obstacles are present based on the sensor feedback. After determining that no obstacles are present, the controller 250 may enable excavation operations (e.g., excavating a trench). For example, the sensor assembly 260 may monitor the area behind the work vehicle 100 (e.g., the area within the digging path along the dig length 12). In response to the controller 250 receiving an indication that no obstacles are detected by the sensor assembly 260, the controller 250 may enable the backhoe tool 200 to commence excavating. In response to the controller 250 receiving an indication that an obstacle is detected by the sensor assembly 260, the controller 250 may disable movement of the backhoe tool 200.

In some embodiments, after the controller 250 enables this backhoe tool 200 to commence excavating, the controller may automatically control the backhoe tool 200 to remove the dirt via the bucket 208 until the excavation 20 is of a target length and target depth. In some embodiments, the sensor assembly 260 positioned on the backhoe tool may output sensor data indicative of the size of the excavation 20 to the controller 250. The controller may instruct the backhoe tool 200 to continue based on sensor feedback indicative of the excavation 20 of a suitable size (e.g., length 12 and depth 14) being excavated. For example, the controller may operate the backhoe tool 200 to an excavating (e.g., digging) plan that may include lowering the backhoe tool 200, extending a member (e.g., an outer dipper) associated with the backhoe tool, pivoting the bucket 208, and the like. In other embodiments, the excavating may be performed by the operator via inputs to the user interface or attachment controls 112 of the work vehicle 100. The entire excavation operations and relocation operations may be performed automatically based on a target excavation location and dimensions. For example, the excavation operations and relocation operations may continue until the digging an excavation of target dimensions is complete. Alternatively or in addition, the relocation operations may be automatic, while the excavation operations may be manual.

After excavating the excavation 20 (e.g., with target dimensions of the length 12 and depth 14), the controller 250 may determine whether the entire relocation operation and/or excavation operation is complete. For example, the controller 250 may determine whether the total length of the excavation equals the target length (e.g., based on sensor feedback). If the total length of the excavation is less than the target length (e.g., below a threshold value), the controller 250 may output a signal indicative of instructions to raise the chassis 130 and the backhoe tool 200, thereby initiating the relocation operation described above. As such, the chassis 130 may be raised in response to the controller 250 determining that relocation operations have not been completed. If the controller 250 determines that relocation operations have been completed, the controller 250 may end relocation operations. Accordingly, in some embodiments, in response to the controller 250 determining that the relocation operations have been completed, the controller 250 may shut down the work vehicle 100, engage the transmission into park, initiate manual control of the work vehicle 100, and the like.

Figure 5:
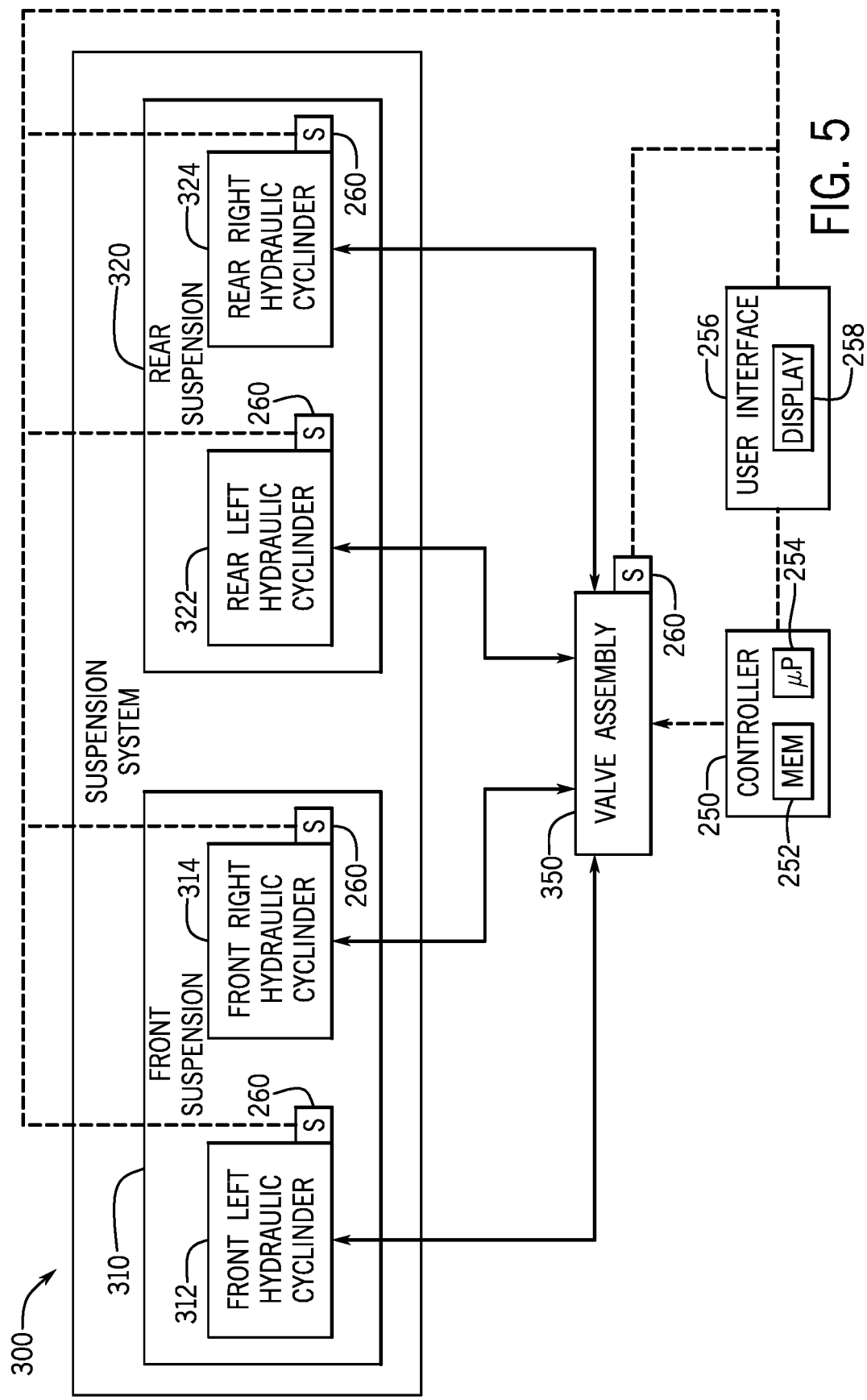
FIG. 5 is a block diagram of an embodiment of a suspension system that may be employed within the work vehicle of FIG. 1.

FIG. 5 is a block diagram of an embodiment of the suspension system 300 that may be employed within the work vehicle 100 of FIG. 1, including a valve assembly 350. In the illustrated embodiment, the suspension system 300 includes the front suspension assembly 310 and the rear suspension assembly 320. The front suspension assembly 310 includes a front left hydraulic cylinder 312 and a front right hydraulic cylinder 314. The rear suspension assembly 320 includes a rear left hydraulic cylinder 322 and a rear right hydraulic cylinder 324. In the illustrated embodiment, the hydraulic cylinders are each fluidly coupled to the valve assembly 350 (e.g., via respective hydraulic lines). In some embodiments, the valve assembly 350 is configured to control hydraulic fluid flow into the hydraulic cylinders to drive movement of the cylinders. For example, the valve assembly 350 may direct fluid into the hydraulic cylinders of the front suspension assembly 310 and the rear suspension assembly 320 to drive upward movement of the chassis (e.g., along the upward direction). In addition, the valve assembly 350 may direction fluid out of the hydraulic cylinders of the front suspension assembly 310 and the rear suspension assembly 320 to drive downward movement of the chassis (e.g., along the downward direction). In some embodiments, the system used to lower the chassis may be separate from the suspension system 300.

In the illustrated embodiment, the controller 250 is communicatively coupled to the valve assembly 350 and configured to control the fluid flow into each of the hydraulic cylinders, thereby controlling the position of the chassis. For example, during relocation operations, the controller 250 may determine that the chassis should be lowered so the front attachment 140 and the rear stabilizer 150 contact the ground 101 (e.g., in response to sensor feedback indicative of the vertical distanced between the front attachment 140 and the rear stabilizer 150, respectively, are not zero. As such, the controller 250 may output a signal to the valve assembly 350 indicative of instructions to drain hydraulic fluid from the front left hydraulic cylinder 312, the front right hydraulic cylinder 314, the rear left hydraulic cylinder 322, the rear right hydraulic cylinder 324, or some combination thereof. In some embodiments, the valve assembly 350 may continue to drain hydraulic fluid from the cylinders until the sensor assembly 260 detects that the chassis has been lowered such that the front attachment and the rear stabilizer contact the ground. In some embodiments, the operator may control the valve assembly 350 via user input to the user interface 256.

In the illustrated embodiment, the front left hydraulic cylinder 312, the front right hydraulic cylinder 314, the rear left hydraulic cylinder 322, the rear right hydraulic cylinder 324, and the valve assembly 350 each include a sensor assembly 260. The sensor assemblies 260 associated with the hydraulic cylinders and the valve assembly may be communicatively coupled to the controller 250. In some embodiments, the sensor assemblies 260 associated with the hydraulic cylinders and the valve assembly 350 may output signal(s) indicative of certain parameters of the hydraulic cylinders and/or the valve assembly 350. For example, the sensor assemblies 260 may detect fluid pressure within the hydraulic cylinders, positions of the hydraulic cylinders, and the like.

Although in the illustrated embodiment, the movement of the chassis is driven by controlling fluid flow to the cylinders via the valve assembly, in alternative embodiments, the movement of the chassis may be driven by another suitable system. For example, the movement of the chassis 0 may be driven by linear actuator(s), pneumatic system(s), or any other suitable system (e.g., a system that is part of the suspension system).

Figure 6:
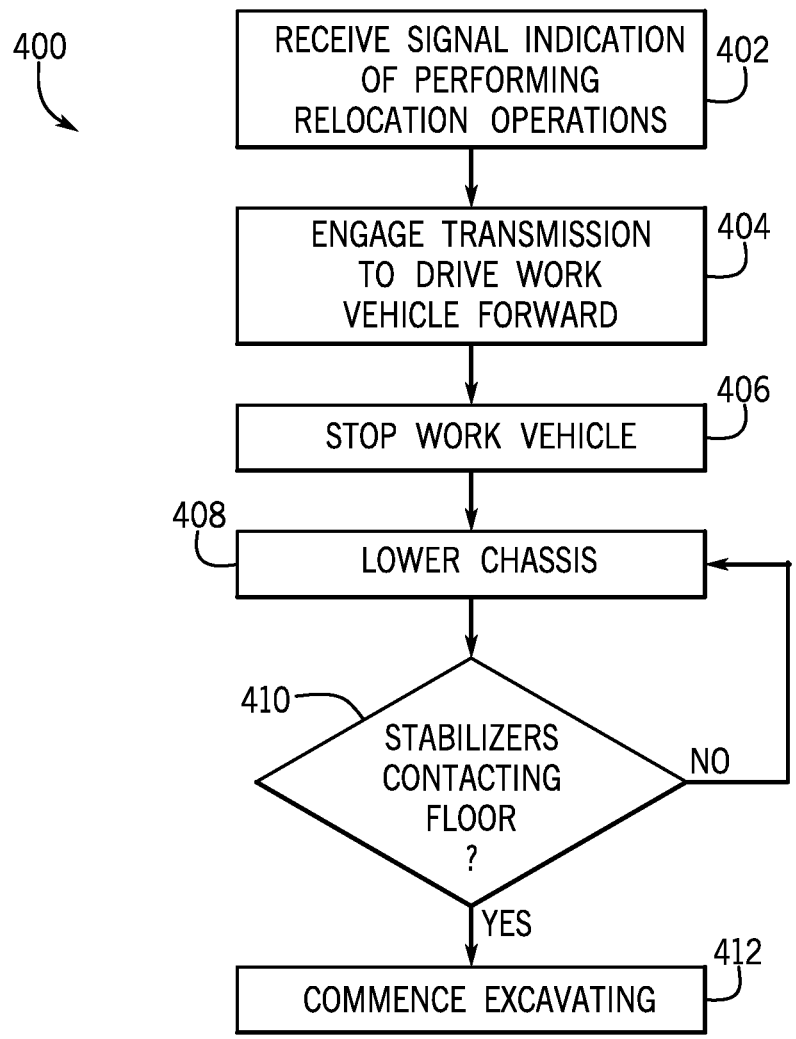
FIG. 6 is a flow diagram of an embodiment of a method for performing relocation operations using the work vehicle of FIG. 1.

FIG. 6 is a flow diagram 400 of an embodiment of a method for performing excavation operations using by the work vehicle of FIG. 1. The method in the illustrated embodiment may be performed by the controller of the work vehicle or a remote controller. The controller may include instructions stored in the memory device that may be executed by the processor to perform the following tasks. As mentioned above, the controller may receive a control signal indicative of performing relocation operations (process block 402), whereby the controller sends a control signal to raise the chassis and executes (e.g., automatically) the steps discussed below. The controller may instruct a movement control system to drive the work vehicle forward (process block 404) a suitable distance. After the work vehicle travels the suitable distance, the controller may instruct the movement control system to stop the work vehicle (process block 406) and the chassis to lower (process block 408). After determining that the front attachment and the rear stabilizer are contacting the ground (decision block 410), the chassis may stop being lowered and excavating may commence (process block 412).

As mentioned above, the controller may receive a signal indicative of performing the relocation operations (process block 402). In some embodiments, the signal indicative of performing the relocation operations may cause the controller to instruct the suspension system to raise the chassis. Before the controller receives the indication of performing the relocation operations, the chassis may be in a lowered position, the work vehicle may be in a manual mode of operation, or the work vehicle may be deactivated. For example, the controller may activate and commence excavation operations after receiving the control signal indicative of performing the relocation operations. In certain embodiments, the operator may be seated inside the work vehicle, facing the backhoe, and the user interface outputs a signal in response to the operator input indicative of raising the chassis. The controller may actuate the valve assembly to control the hydraulic cylinders of the suspension assembly to raise the chassis in response to receiving the signal, thereby disengaging the front attachment and the rear stabilizer from the ground.

After the controller determines that the chassis has been raised (e.g., such that the front attachment and rear stabilizer do not contact the ground), the controller may instruct the movement control system to drive the work vehicle forward (process block 404) a target distance. As such, the controller may be coupled to the movement control system of the work vehicle to (e.g., automatically) drive the work vehicle. In some embodiments, the controller may instruct the movement control unit to drive the work vehicle any suitable distance forward. For example, the controller may engage the movement control system (e.g., the transmission or the hydraulic system) to drive the work vehicle forward a distance substantially equal to the dig length of the backhoe tool (e.g., to continue to extend the length of the excavation). After the work vehicle drives the distance forward (e.g., the dig length) the controller may instruct a braking system to stop the work vehicle (process block 406). In certain embodiments, the controller may receive data from the sensor assembly indicative of the work vehicle moving a distance less than the target distance. In response to receiving the data indicative of the work vehicle moving less than the target distance, the controller may instruct the movement control system to move the vehicle to the target distance. For example, the controller may determine that the work vehicle has traveled the target distance, and then the controlled may engage the braking system of the work vehicle to stop the work vehicle at or near the target distance (e.g., the dig length 12).

After stopping the work vehicle, the controller may instruct the suspension system to lower the chassis (process block 408). In some embodiments, the controller instructs the chassis to lower by outputting control signals to the valve assembly of the suspension system. In some embodiments, the controller instructs the chassis to lower until it determines that the front attachment and rear stabilizer are in contact with the ground. That is, the controller determines whether the stabilizers contact the ground (decision block 410). In some embodiments, the controller determines if the chassis has been lowered based on sensor data from the sensor assemblies. For example, the front attachment and the rear stabilizer may include respective proximity sensors configured to determine the position of the front attachment and the rear stabilizer relative to the ground, respectively. In some embodiments, the sensor assemblies may be coupled to the front attachment and the rear stabilizer of the work vehicle. For example, the sensor assemblies may determine the location of the front attachment and the rear stabilizer, and then output sensor data indicative of the position of the front attachment and the rear stabilizers to the controller. The controller may continue to lower the chassis (e.g., via the valve assembly) until the distance between the ground and front attachment and the distance between the ground and rear stabilizer are both zero.

When the controller determines that the stabilizers are in contact with the ground, the controller commences excavation operations (e.g., excavating) (process block 412). In some embodiments, the controller is communicatively coupled to the backhoe tool, such that the controller may send control signals to the backhoe tool indicative of excavating the excavation. For example, after determining that the stabilizers are in contact with the ground, the controller causes the backhoe tool to move between the raised extended position to the lowered extended position until an excavation of suitable dimensions has been excavated. After the excavation of the suitable dimension (e.g., a depth and length equal to the dig length) has been excavated, the process may restart. That is, after the backhoe tool excavates the excavation (e.g., of the suitable dimension), the controller may receive a signal indicative of performing (e.g., or continuing) relocation operations (process block 402).

In some embodiments, each step is based on a user input. That is, after the controller performs any of the above mentioned steps (e.g., process blocks 402, 404, 406, 408, and 412 and decision block 410), the controller may wait for a user input indicative of confirmation to proceed. For example, after excavation is complete, the controller may wait until the controller receives a user input indicative of confirmation to proceed. The user input indicative of confirmation to proceed may include receiving a signal from the user interface. In alternative embodiments, the method may be performed without interruption upon receiving the initial signal indicative of performing relocation operations. That is, the process of flow diagram 400 may be perform automatically by the controller without confirmation from the operator. Furthermore, the steps performed by the flow diagram 400 may be performed in any suitable order.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A control system for a work vehicle, wherein the control system comprises:
 a controller, comprising:
  a processor; and
  a memory device communicatively coupled to the processor and configured to store instructions configured to cause the processor to:
   receive a first control signal indicative of performing relocation operations; and
   instruct an actuator assembly to drive a chassis of the work vehicle in an upward direction relative to wheels of the work vehicle in response to receiving the first control signal, such that a front stabilizer and a rear stabilizer are disengaged from a ground, wherein the rear stabilizer is non-movably coupled to the chassis, such that an end of the rear stabilizer configured to contact the ground does not move relative to the chassis, the actuator assembly comprises a plurality of hydraulic cylinders of a suspension system of the work vehicle, and the suspension system connects the chassis of the work vehicle to the wheels of the work vehicle.

2. The control system of claim 1, wherein the front stabilizer comprises a front attachment.

3. The control system of claim 2, wherein the front attachment comprises a loader.

4. The control system of claim 1, comprising a user interface communicatively coupled to the controller, wherein the user interface is configured to receive the first control signal.

5. The control system of claim 1, wherein the instructions configured to cause the processor to instruct the actuator assembly to drive the chassis in the upward direction comprise instructions to instruct the actuator assembly to drive the chassis in the upward direction until a first vertical distance between the front stabilizer and the ground is greater than a first vertical threshold distance, until a second vertical distance between the rear stabilizer and the ground is greater than a second vertical threshold distance, or a combination thereof.

6. The control system of claim 1, wherein the instructions are configured to cause the processor to instruct the actuator assembly to drive the chassis in a downward direction until a first vertical distance between the front stabilizer and the ground is zero, until a second vertical distance between the rear stabilizer and the ground is zero, or a combination thereof.

7. The control system of claim 1, wherein the wheels remain in contact with the ground while the front stabilizer and the rear stabilizer are engaged with the ground.

8. The control system of claim 2, wherein the front attachment is configured to be driven to move relative to the chassis by a respective hydraulic cylinder.

9. A control system for a work vehicle, wherein the control system comprises:
 a controller; comprising:
  a processor; and
  a memory device communicatively coupled to the processor and configured to store instructions configured to cause the processor to:
   receive a first control signal indicative of performing relocation operations, wherein performing relocation operations comprises instructing a movement control system to move the work vehicle a target distance along a direction of travel; and
   instruct an actuator assembly to drive a chassis of the work vehicle in an upward direction relative to wheels of the work vehicle in response to receiving the first control signal until a first vertical distance between a front stabilizer and a ground is greater than a first vertical threshold distance, until a second vertical distance between a rear stabilizer and the ground is greater than a second vertical threshold distance, or a combination thereof, wherein the rear stabilizer is non-movably coupled to the chassis, such that an end of the rear stabilizer configured to contact the ground does not move relative to the chassis, the actuator assembly comprises a plurality of hydraulic cylinders of a suspension system of the work vehicle, and the suspension system connects the chassis of the work vehicle to the wheels of the work vehicle.

10. The control system of claim 9, wherein the target distance to matches a dig length of a backhoe tool of the work vehicle, wherein the backhoe tool is configured to excavate the ground.

11. The control system of claim 9, wherein instructing the movement control system to move the work vehicle the target distance comprises instructing the movement control system to engage a transmission of the work vehicle to drive the work vehicle forward the target distance along the direction of travel.

12. The control system of claim 9, comprising a first sensor assembly associated with the front stabilizer, wherein the first sensor assembly is communicatively coupled to the controller and configured to output a signal indicative of the first vertical distance.

13. The control system of claim 9, comprising a second sensor assembly associated with the rear stabilizer, wherein the second sensor assembly is communicatively coupled to the controller and configured to output a signal indicative of the second vertical distance.

14. The control system of claim 9, wherein the instructions are configured to cause the processor to instruct the movement control system to stop the work vehicle in response to determining that the work vehicle has moved the target distance along the direction of travel.

15. The control system of claim 9, wherein the instructions are configured to cause the processor to instruct the actuator assembly to drive the chassis in a downward direction until the first vertical distance between the front stabilizer and the ground is zero, until the second vertical distance between the rear stabilizer and the ground is zero, or a combination thereof, in response to determining that the work vehicle has moved the target distance along the direction of travel.

16. The control system of claim 9, wherein the instructions are configured to cause the processor to instruct a backhoe tool to commence excavating.

17. The control system of claim 16, wherein the excavating ends in response to receiving a sensor signal indicative of determining that an excavation length matches a dig length of the backhoe tool.

18. A work vehicle configured to excavate, comprising:
a backhoe tool configured to excavate a ground;
a suspension system comprising an actuator assembly, the actuator assembly comprising a plurality of hydraulic cylinders, and the suspension system connecting a chassis of the work vehicle to wheels of the work vehicle;
a rear stabilizer non-movably coupled to the chassis, such that an end of the rear stabilizer configured to contact the ground does not move relative to the chassis; and
a control system configured to communicatively couple to the suspension system, wherein the control system comprises:
a controller, comprising:
a processor; and
a memory device communicatively coupled to the processor and configured to store instructions configured to cause the processor to:
receive a first control signal indicative of performing relocation operations, wherein performing relocation operations comprises instructing a movement control system to move the work vehicle a target distance along a direction of travel; and
instruct the actuator assembly to drive the chassis of the work vehicle in an upward direction relative to the wheels of the work vehicle in response to receiving the first control signal until a first vertical distance between a front stabilizer and the ground is greater than a first vertical threshold distance, until a second vertical distance between the rear stabilizer and the ground is greater than a second vertical threshold distance, or a combination thereof; and
instruct the actuator assembly to drive the chassis in a downward direction until the first vertical distance between the front stabilizer and the ground is zero, until the second vertical distance between the rear stabilizer and the ground is zero, or a combination thereof, in response to determining that the work vehicle has moved the target distance along the direction of travel.

19. The work vehicle of claim 18, wherein the instructions are configured to cause the processor to instruct the backhoe tool to commence excavating.

* * * * *